US008678700B2

(12) United States Patent
Tsai

(10) Patent No.: US 8,678,700 B2
(45) Date of Patent: Mar. 25, 2014

(54) FOLDABLE FURNITURE WITH RETENTION STRUCTURE

(76) Inventor: Frank Tsai, Shenzhen (CN)

( * ) Notice: Subject to any disclaimer, the term of this patent is extended or adjusted under 35 U.S.C. 154(b) by 227 days.

(21) Appl. No.: 12/658,962

(22) Filed: Feb. 17, 2010

(65) Prior Publication Data

US 2010/0209182 A1 Aug. 19, 2010

(30) Foreign Application Priority Data

Feb. 17, 2009 (CN) .................. 2009 2 0130016 U

(51) Int. Cl.
*F16B 7/04* (2006.01)

(52) U.S. Cl.
USPC ............ 403/400; 403/95; 403/113; 297/16.1; 297/55

(58) Field of Classification Search
USPC ............... 403/93, 95–97, 106, 161, 364, 388, 403/400, 346, 113, 162, 163; 297/161, 31, 297/55, 56, 16.1; 108/120, 118, 119; 16/303, 374, 375, 376, 377
See application file for complete search history.

(56) References Cited

U.S. PATENT DOCUMENTS

| 562,901 | A | * | 6/1896 | Lambert | 403/114 |
| 2,706,829 | A | * | 4/1955 | Charnin | 16/376 |
| 3,041,092 | A | * | 6/1962 | Eves et al. | 403/73 |
| 3,298,537 | A | * | 1/1967 | Di Marco | 211/200 |
| 5,062,179 | A | * | 11/1991 | Huang | 16/436 |

* cited by examiner

*Primary Examiner* — Gregory Binda
*Assistant Examiner* — Nahid Amiri
(74) *Attorney, Agent, or Firm* — Raymond Y. Chan; David and Raymond Patent Firm

(57) ABSTRACT

A foldable furniture includes a retention structure including a left retention coupler and a right retention coupler coaxially and overlapping with the left retention coupler side-by-side in a rotatably movable manner via a pivot joint. The left retention coupler includes at least a left retention member protruding towards the right retention coupler. The right retention coupler includes at least a right retention member protruding towards the left retention coupler, wherein when the foldable furniture is pivotally folded at an unfolded position, the left and right retention couplers are coaxially rotated at an opposite direction until the left and right retention members are biased against each other. Therefore, the retention structure enhances the structural supportive force of the foldable furniture to evenly distribute the loading force on the foldable furniture so as to enhance the stabilization of the foldable furniture.

1 Claim, 16 Drawing Sheets

FOLDABLE FURNITURE WITH RETENTION STRUCTURE

BACKGROUND OF THE PRESENT INVENTION

1. Field of Invention

The present invention relates to a retention structure, and more particularly to a retention structure which incorporates with a foldable furniture, such as the foldable table or chair, for retaining the foldable furniture between its folded and unfolded positions.

2. Description of Related Arts

With present furniture manufacturing technology, a variety of foldable structure is used in the furniture because the furniture can be folded up as a portable furniture such that it is convenient for people to transport the furniture and it needs less room for storage. Therefore, the furniture, such as folding chair or table, is considered as a common tool being used at homes, offices, and during camping. However, the foldable structure does not provide enough supportability and stabilization for the furniture. In other words, the loading force is not evenly distributed on each portion of the furniture so that the legs of the furniture or other supportive portions of the furniture will be deformed or even broken by the loading force.

SUMMARY OF THE PRESENT INVENTION

The main object of the present invention is to provide a foldable furniture, such as foldable table or chair, with a retention structure to overcome the above mentioned problems, wherein the retention structure enhances the structural supportive force of the foldable furniture to evenly distribute the loading force on the foldable furniture so as to enhance the stabilization of the foldable furniture.

Accordingly, in order to accomplish the above object, the present invention provides retention structure for incorporating with a pivot joint of a foldable furniture, comprising a left retention coupler, a right retention coupler, and a pivot joint for coaxially coupling the left retention coupler with the left retention coupler side-by-side in a rotatably movable manner. The left washer has a left retention member protruding at an outer circumferential edge of the left retention coupler towards the right retention coupler. The right retention coupler has a right retention member protruding at an outer to circumferential edge of the right retention coupler towards the left retention coupler, wherein when the foldable furniture is pivotally folded at its unfolded position, the left and right retention couplers are coaxially rotated at an opposite direction until the left and right retention members are biased against each other.

The advantage of the present embodiment is that when the foldable furniture is pivotally folded at its unfolded position, the left and right retention members are biased against and interlock with each other so as to evenly distribute and transmit the loading force through the foldable furniture. In other words, the retention structure of the foldable furniture is adapted to evenly distribute the downward loading force to the supporting legs of the foldable furniture such that the supporting legs of the foldable furniture are evenly supported the loading force to prevent one of the supporting legs being distorted. Therefore, the retention structure enhances the structural supportive force of the foldable furniture to evenly distribute the loading force on the foldable furniture so as to enhance the stabilization of the foldable furniture.

These and other objectives, features, and advantages of the present invention will become apparent from the following detailed description, the accompanying drawings, and the appended claims.

DETAILED DESCRIPTION OF THE PREFERRED EMBODIMENT

Figure 1:
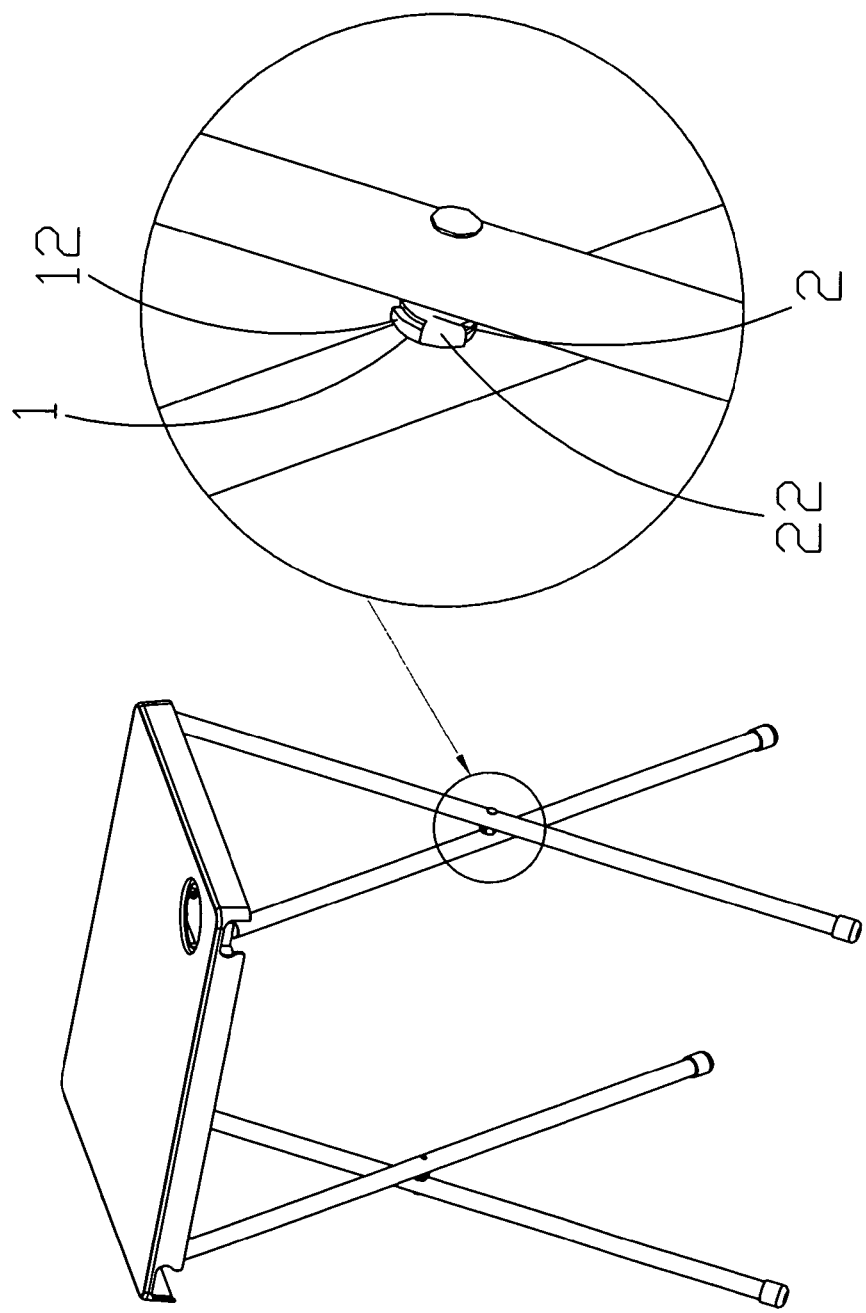
FIG. 1 is a perspective view of a foldable furniture according to a preferred embodiment of the present invention, illustrating the foldable table with the retention structure being pivotally folded at an unfolded position.
Figure 2:
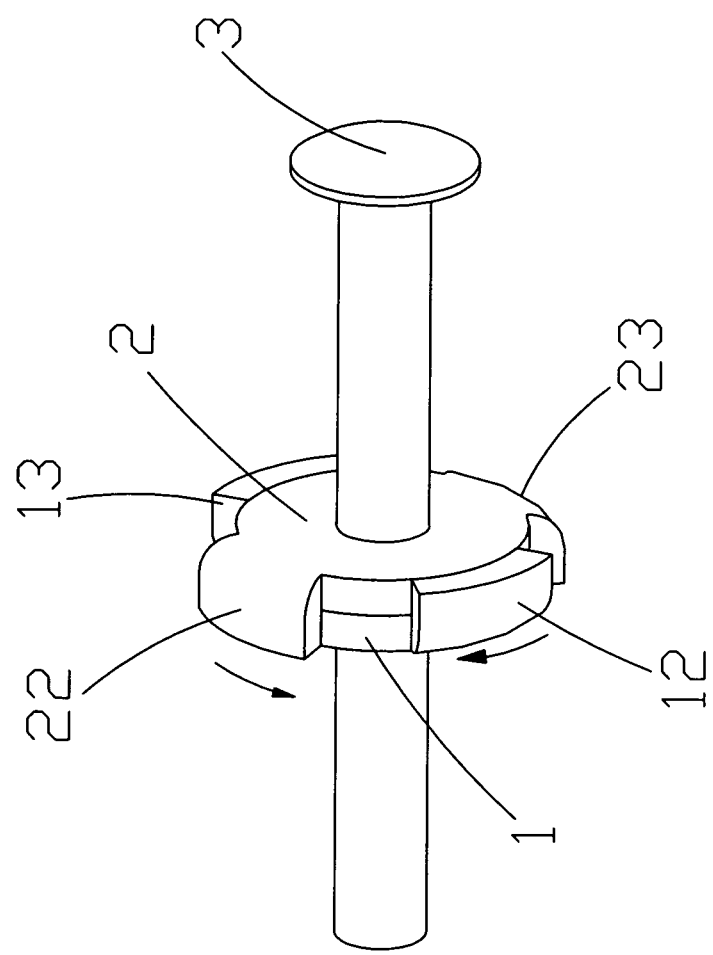
FIG. 2 is a perspective view of the retention structure incorporating with the pivot hinge of the foldable furniture according to the above preferred embodiment of the present invention, illustrating the rotational movement between the left and right washers.
Figure 3:
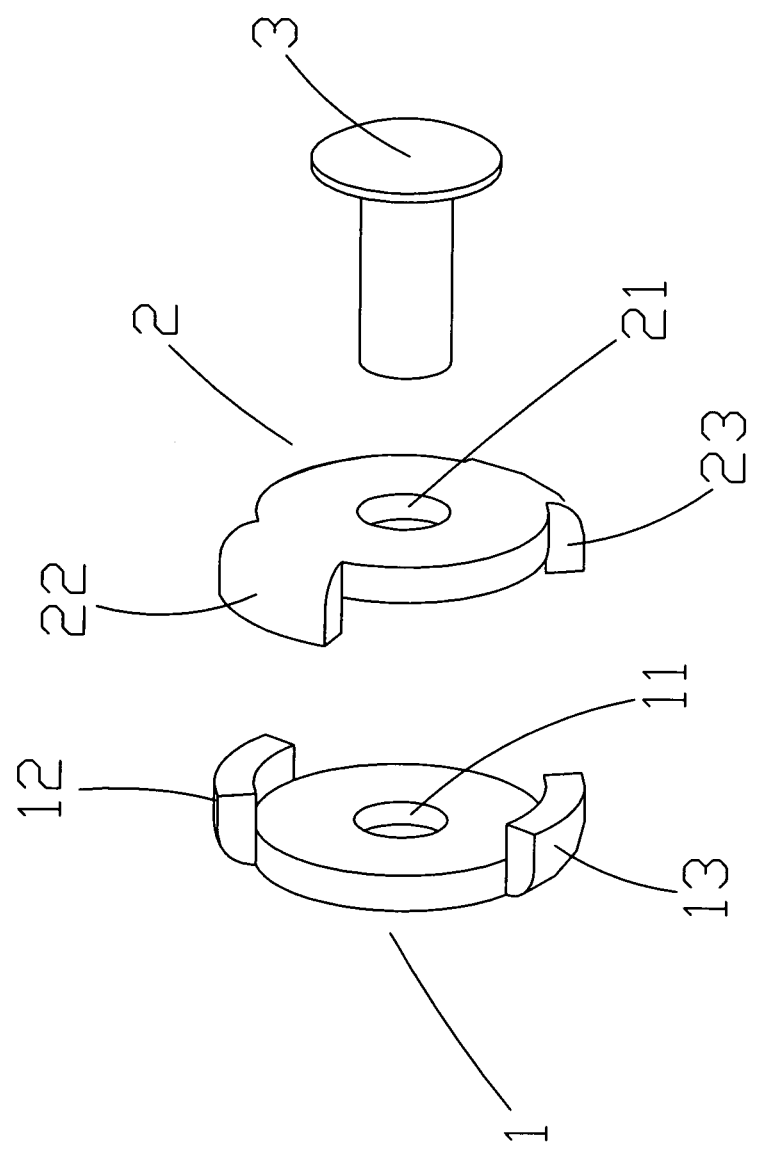
FIG. 3 is an exploded perspective view of the retention structure according to the above preferred embodiment of the present invention.

Referring to FIGS. 1 to 3 of the drawings, a retention structure of a foldable furniture according to a preferred embodiment is illustrated, wherein the foldable furniture is embodied as a foldable table. The retention structure is provided at the foldably supportive portion of the foldable furniture. The retention structure comprises a left retention coupler 1, a right retention coupler 2, and a pivot hinge 3 for coupling with the foldably supportive portion to enable a pivotally folding movement of the foldably supportive portion. The left retention coupler 1 has a first through hole 11 while the right retention coupler 2 has a second through hole 21 coaxially aligned with the first through hole 11. Accordingly, the left and right retention couplers 1, 2 are two washers respectively. The pivot hinge 3, which is embodied as a pivot shaft, is slidably extended through the first and second through holes 11, 21 the left and right retention couplers 1, 2 are coaxially and overlapping with each other side-by-side in a rotatably movable manner via the pivot joint 3.

The left retention coupler 1 comprises two left retention members 12, 13 spacedly and integrally protruding at an outer circumferential edge of the left retention coupler 1 towards the right retention coupler 2. The right retention coupler 2 comprises two right retention members 22, 23 spacedly and integrally protruding at an outer circumferential edge of the right retention coupler 2 towards the left retention coupler 1.

The left and right retention couplers 1, 2 are coupled at the foldably supportive portion of the foldable table. In particularly, the left and right retention couplers 1, 2 are coupled between two corresponding folding legs of the foldable table respectively. When the foldable table is pivotally folded at its unfolded position that the two folding legs are pivotally moved, the left and right retention couplers 1, 2 are coaxially rotated at an opposite direction until the left and right retention members 12, 22 are biased against each other.

Figure 4:
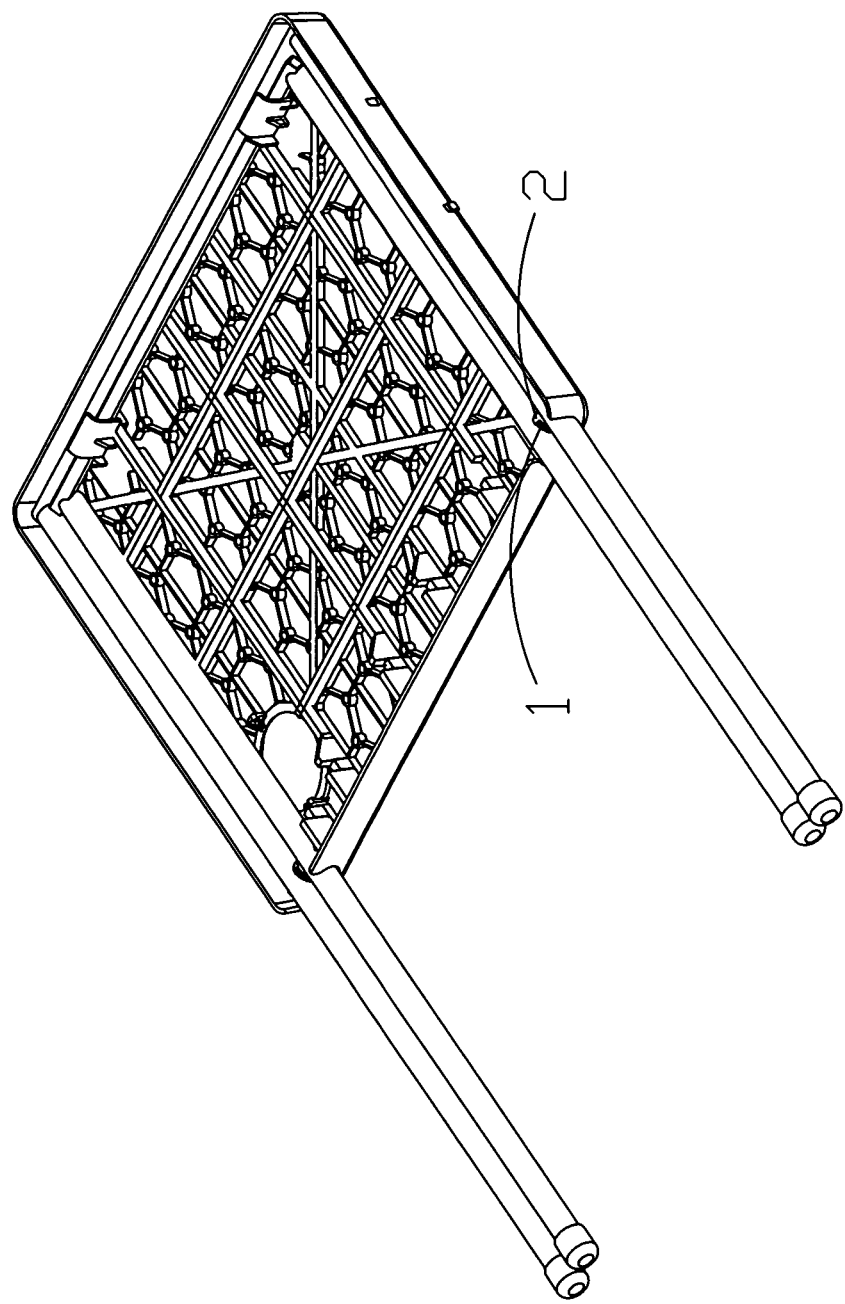
FIG. 4 is a perspective view of the foldable table according to the above preferred embodiment of the present invention, illustrating the foldable table being pivotally folded at its folded position.
Figure 5:
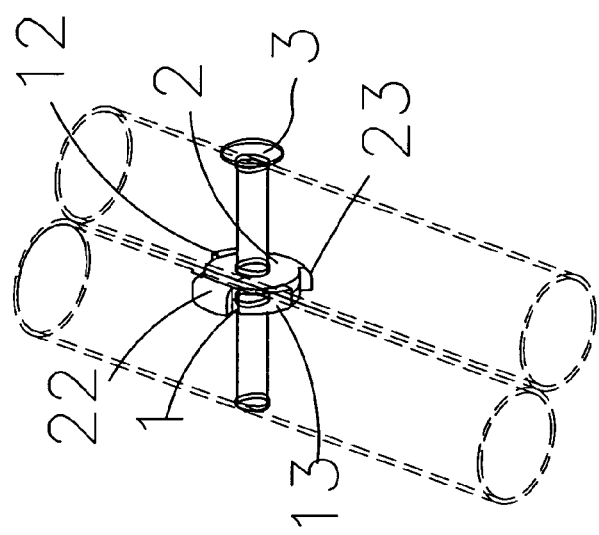
FIG. 5 is a perspective view of the retention structure incorporating with the foldable table according to the above preferred embodiment of the present invention.

FIGS. 4 and 5 illustrate the foldable table being pivotally folded at its folded position. At the folded position of the foldable table, the left and right retention couplers 1, 2 are coaxially rotated at an opposite direction, such that one of the left retention members 12 at the left retention coupler 1 is driven to move apart from the corresponding right retention member 22. In addition, the left retention member 12 of the left retention coupler 1 is moved to bias against the corresponding right retention member 23 of the right retention coupler 2 while another right retention member 22 is moved to bias against another left retention member 13.

Figure 6:
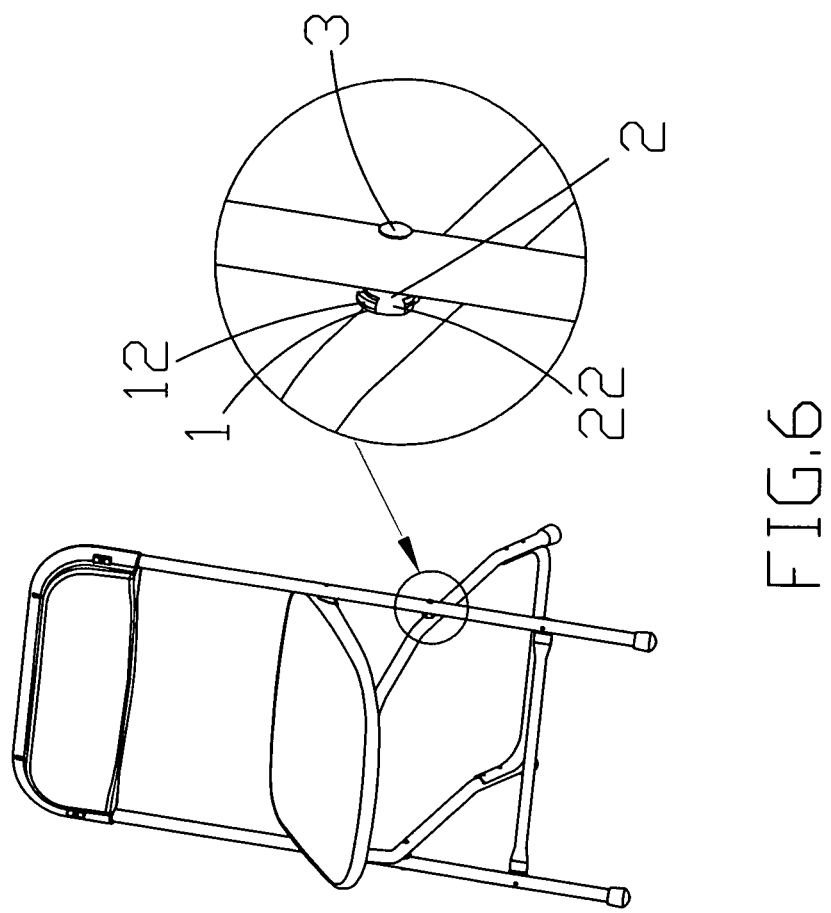
FIG. 6 is a perspective view of the retention structure incorporating with a foldable chair according to the above preferred embodiment of the present invention, illustrating the foldable chair being pivotally folded at its unfolded position.

As shown in FIG. 6, the retention structure can be incorporated with a foldable chair as well. Similar to the foldable table, the left retention member 12 of the left retention coupler 1 is moved to bias against the right retention member 22 of the right retention coupler 2 when the foldable chair is pivotally folded at its unfolded position.

Figure 7:
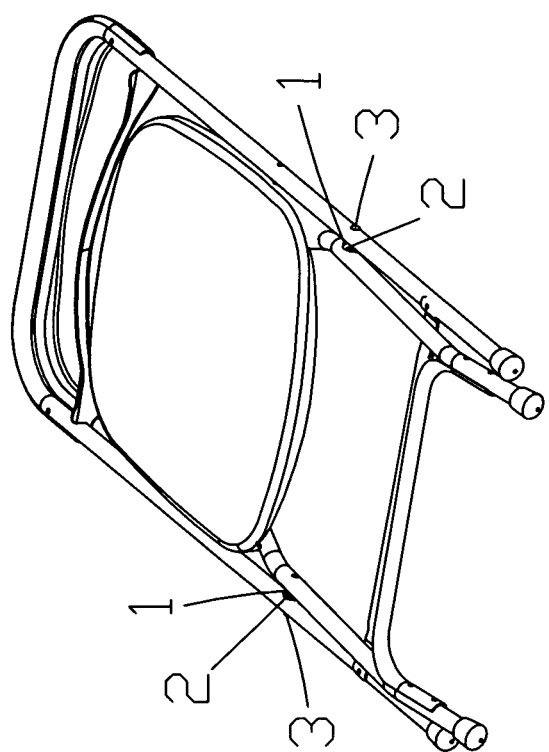
FIG. 7 is a perspective view of the retention structure incorporating with the foldable chair according to the above preferred embodiment of the present invention, illustrating the foldable chair being pivotally folded at its folded position.

FIG. 7 illustrates the foldable chair with the retention structure being pivotally folded at its folded position.

Figure 8:
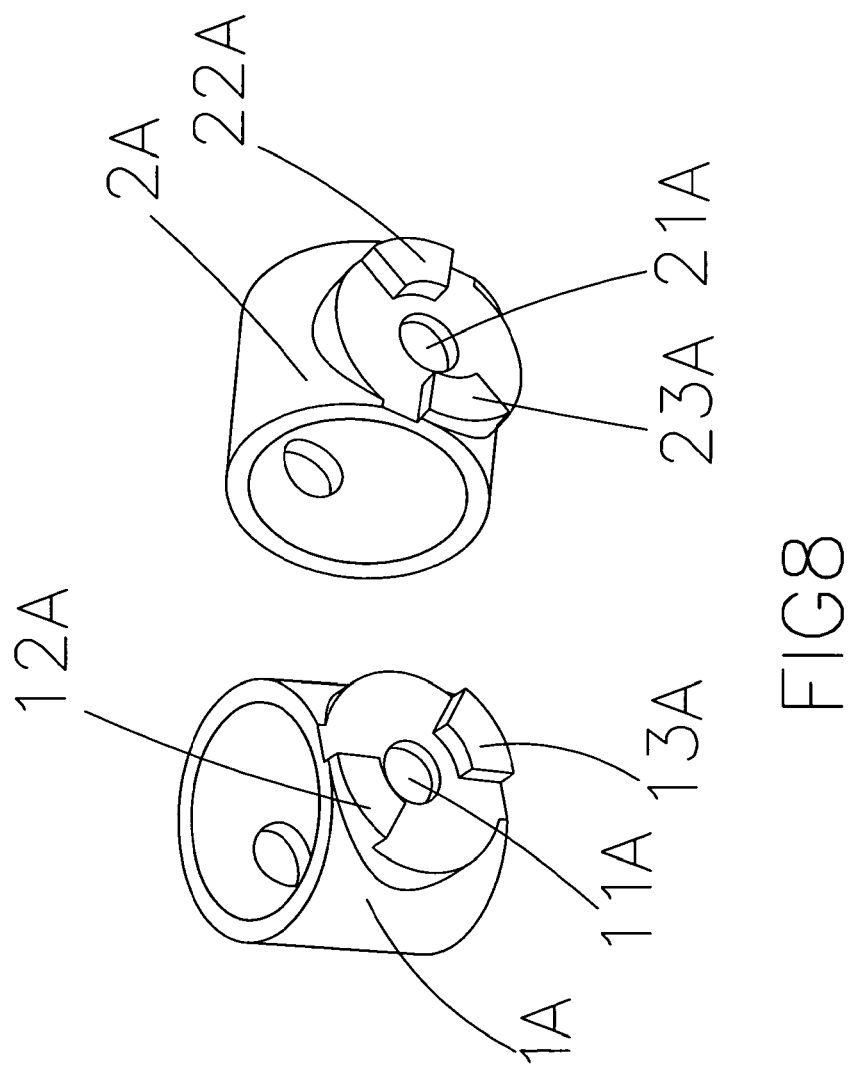
FIG. 8 is a perspective view of the retention structure according to a second preferred embodiment of the present invention, illustrating the left and right retention couplers.
Figure 9:
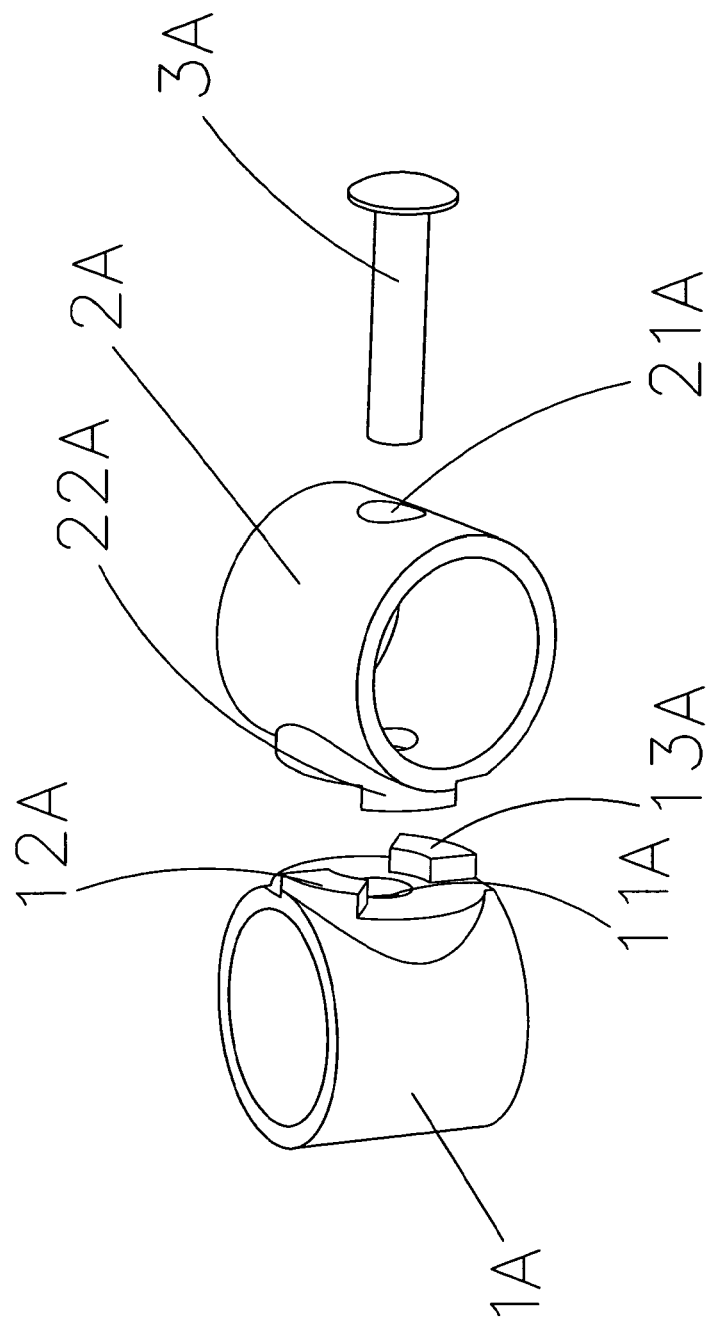
FIG. 9 is an exploded perspective view of the retention structure according to the above second preferred embodiment of the present invention, illustrating the left and right retention couplers being coupled by the pivot joint.
Figure 10:
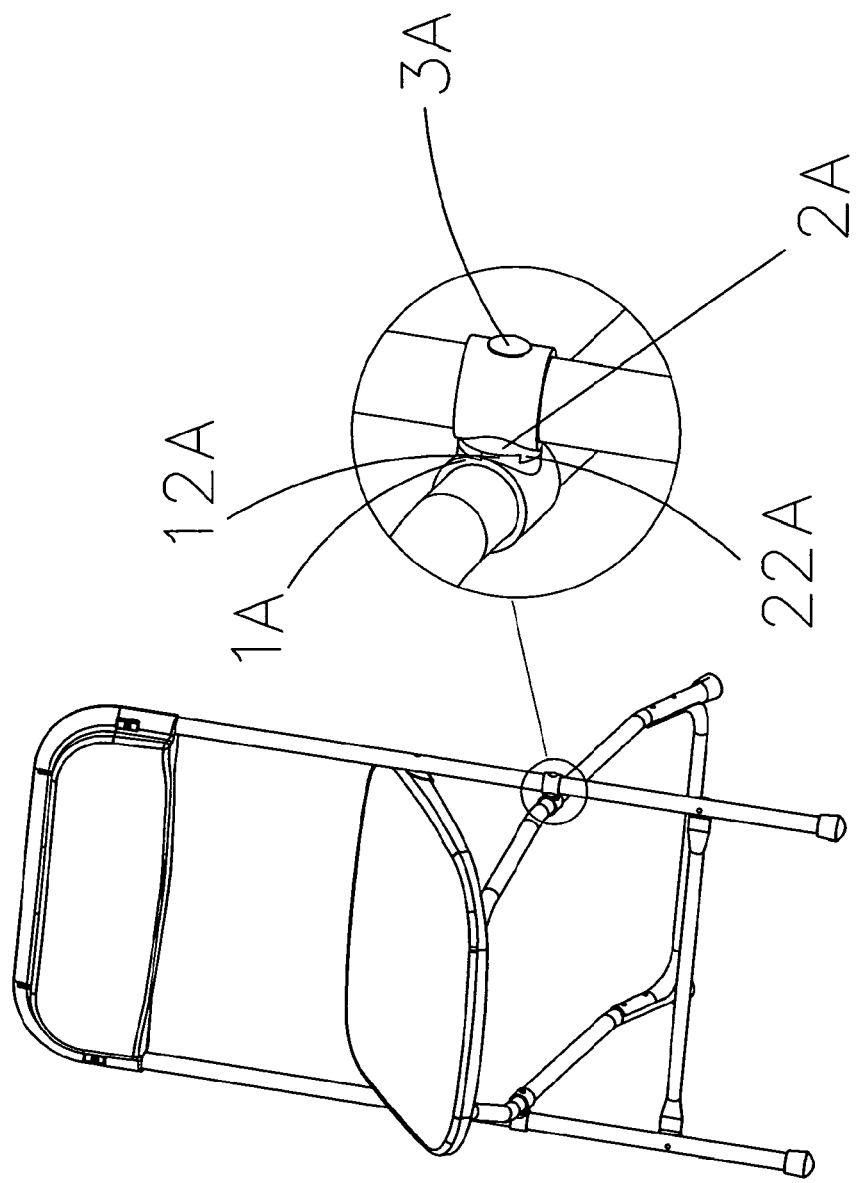
FIG. 10 is a perspective view of the retention structure incorporating with a foldable chair according to the above second preferred embodiment of the present invention.

As shown in FIGS. 8, 9, and 10, a retention structure of a second embodiment illustrates an alternative mode of the first embodiment, wherein the retention structure is adapted to incorporate with the foldable chair. The retention structure comprises a left retention coupler 1A having a tubular shaped portion adapted for coupling with the foldably supportive portion of the foldable chair, i.e. one of the folding legs thereof, wherein the left retention coupler 1A further has a first through hole 11A provided transversely, and two left retention members 12A, 13A protruding sidewardly. The retention structure further comprises a right retention coupler 2A having a tubular shaped portion adapted for coupling with the foldably supportive portion of the foldable chair, i.e. the other folding leg thereof. The right retention coupler 2A further comprises a second through hole 21A provided transversely, and two right retention members 22A, 23A protruding sidewardly. The pivot hinge 3A, which is embodied as a pivot shaft, is slidably extended through the first and second through holes 11A, 12A to rotatably couple the left retention coupler 1A with the right retention coupler 2A.

When the foldable chair is folded at its unfolded position, the left retention member 12A of the left retention coupler 1A is biased against the right retention member 22A of the right retention coupler 2A so as to retain the foldable chair at the unfolded position.

Figure 11:
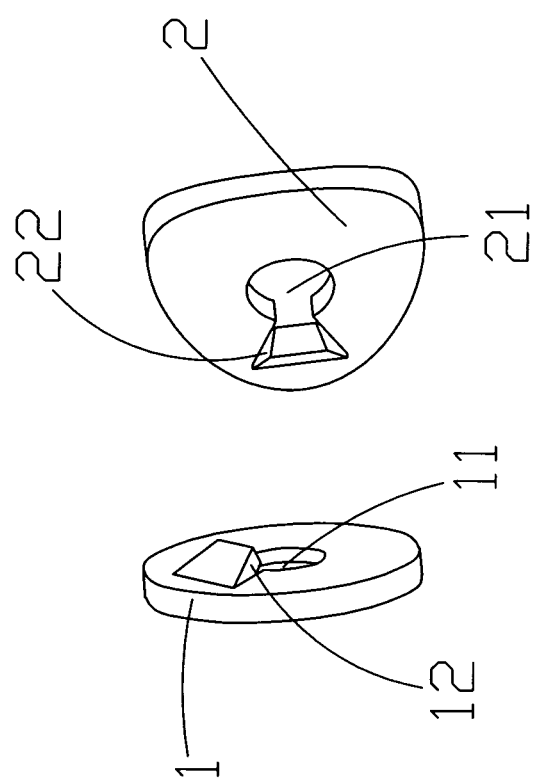
FIG. 11 is a perspective view of the retention structure according to a third preferred embodiment of the present invention, illustrating the left and right retention couplers.
Figure 12:
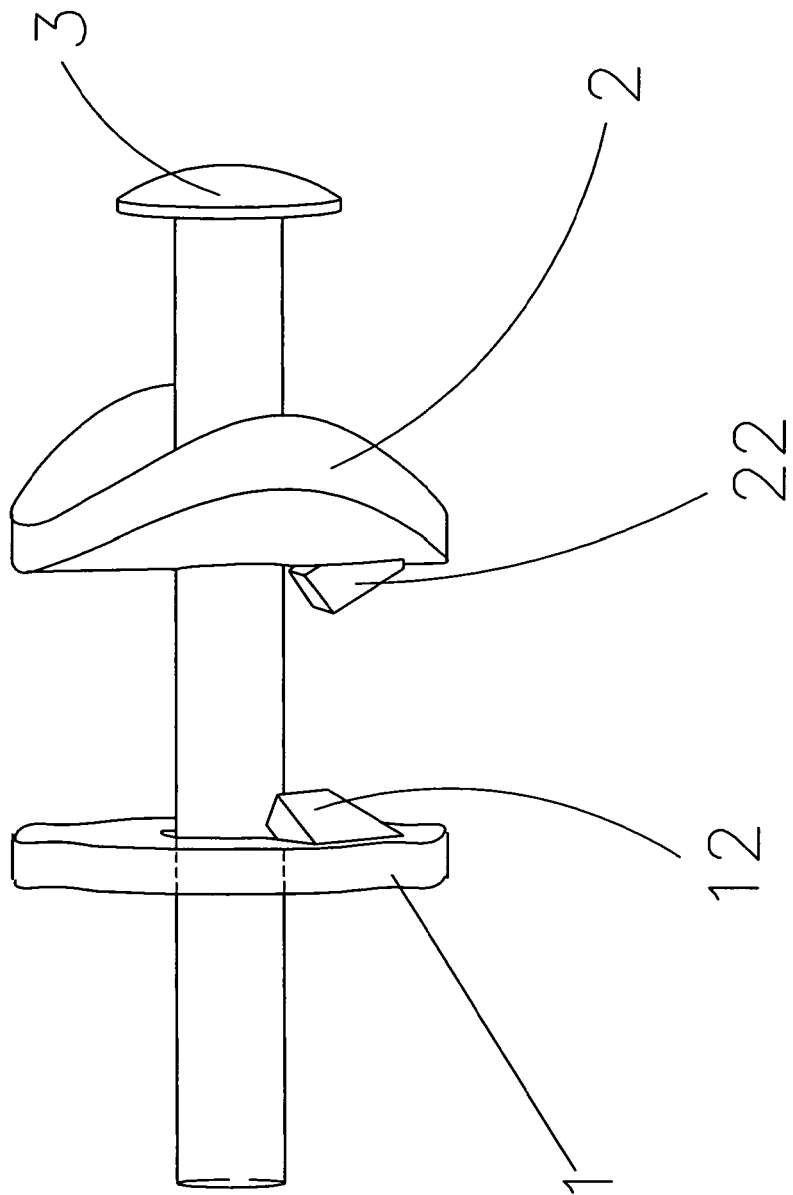
FIG. 12 is an exploded perspective view of the retention structure according to the above third preferred embodiment of the present invention, illustrating the left and right retention couplers being coupled by the pivot joint.
Figure 13:
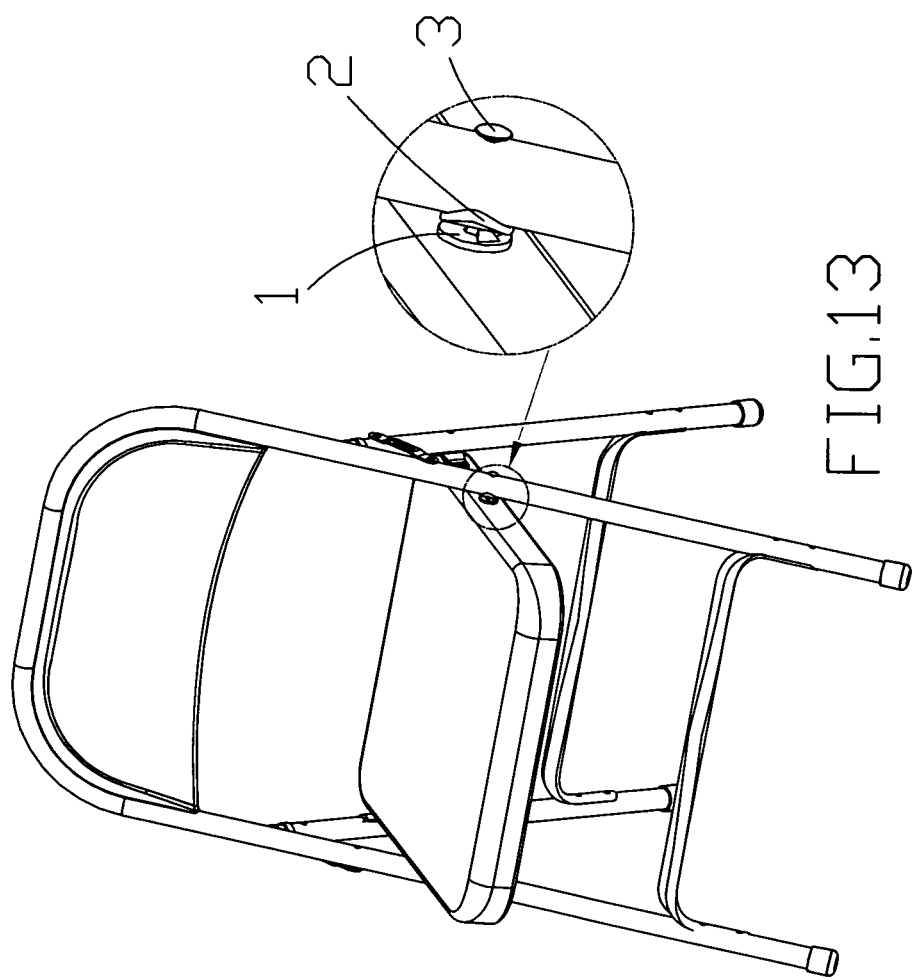
FIG. 13 is a perspective view of the retention structure incorporating with a foldable chair according to the above third preferred embodiment of the present invention.

As shown in FIGS. 11, 12, and 13, the left and right retention couplers 1, 2 are incorporated with the foldably supportive portion of the foldable chair. The left retention coupler 1 has a first through hole 11 and comprises two left retention members 12, 13 protruding sidewardly. The right retention coupler 2 has a second through hole 11 and comprises two right retention members 22, 23 protruding sidewardly towards the left retention coupler 1. The pivot hinge 3, which is embodied as a pivot shaft, is slidably extended through the first and second through holes 11, 21 the left and right retention couplers 1, 2 are coaxially and overlapping with each other side-by-side in a rotatably movable manner via the pivot joint 3.

Accordingly, the left retention member 12 can be provided at a mid-portion of the left retention coupler 1 at a position adjacent to the first through hole 11 while the right retention member 22 can be provided at a mid-portion of the right retention coupler 2 at a position adjacent to the second through hole 21. It is appreciated that the left and right retention members 12, 22 can be located at any position of the left and right retention couplers 1, 2 to correspondingly bias with each other.

When the foldable chair is folded at its unfolded position, the left retention member 12 of the left retention coupler 1 is biased against the right retention member 22 of the right retention member 2 so as to retain the foldable chair at the unfolded position.

Figure 14:
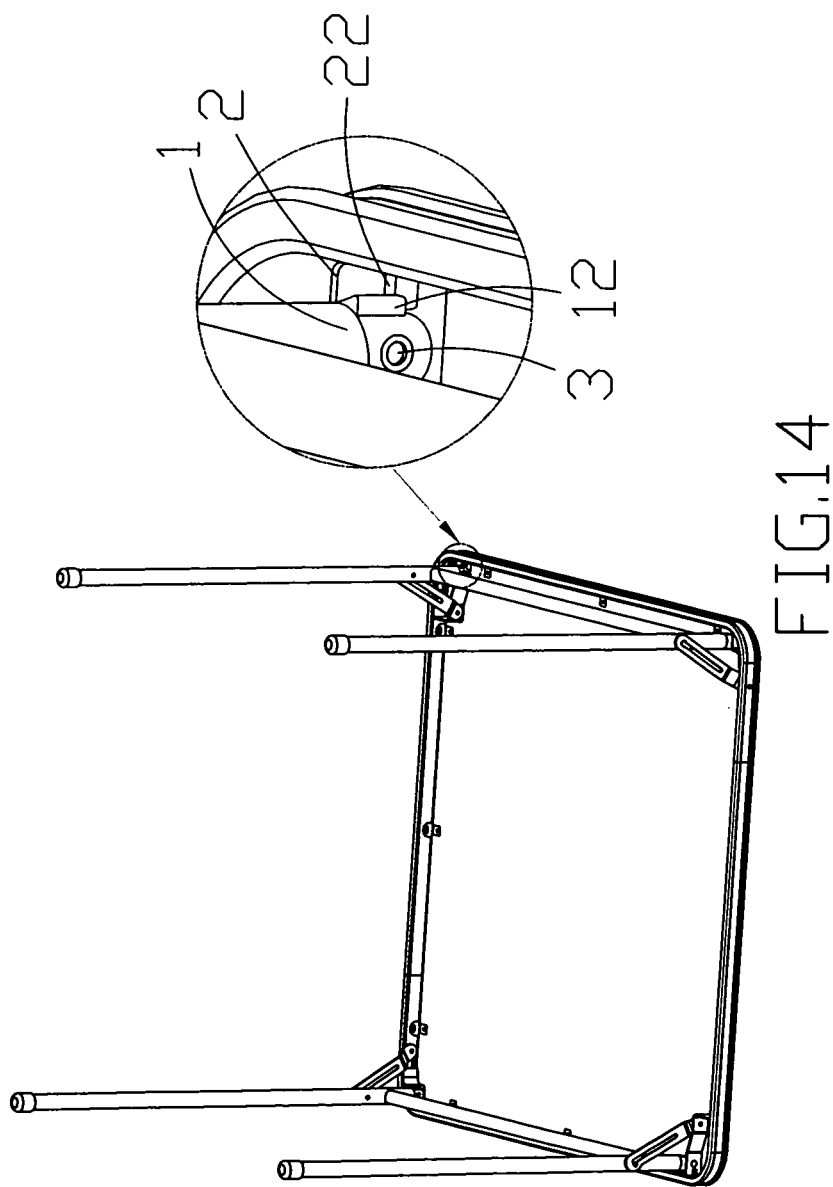
FIG. 14 is a perspective view of the retention structure incorporating with a foldable table according to the above third preferred embodiment of the present invention, illustrating the foldable table being folded at its unfolded position.
Figure 15:
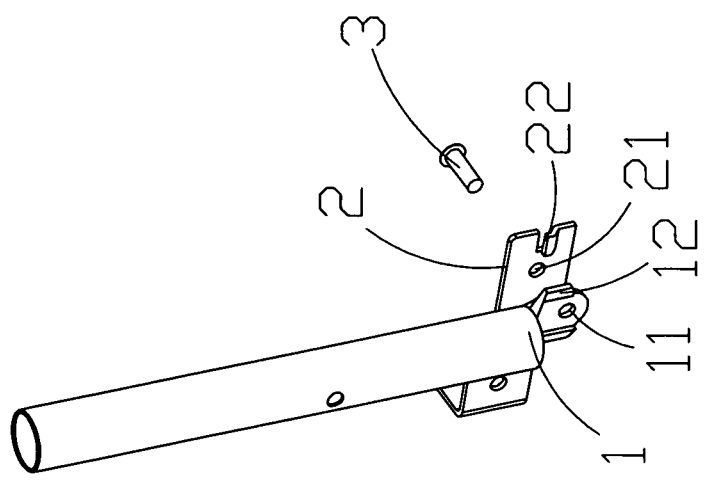
FIG. 15 is an exploded perspective view of the retention structure for the foldable table according to the above third preferred embodiment of the present invention.

As shown in FIGS. 14 and 15, the retention structure of the present invention can be incorporated with a foldable table. The left retention coupler 1 is adapted to couple at the folding leg of the foldable table as part of the foldably supportive portion, wherein the left retention coupler 1 has a first through hole 11 and comprises a left retention member 12 protruded outwardly. The right retention coupler 2 is adapted to couple at supporting frame where the folding leg is pivotally coupled thereat as another part of the foldably supportive portion. The right retention coupler 2 has a second through hole 21 and comprises a right retention member 22. The pivot hinge 3, which is embodied as a pivot shaft, is slidably passed through the first and second through holes 11, 21 to rotatably couple the left retention coupler 1 with the right retention coupler 2.

When the foldable table is folded at its unfolded position, the left retention member 12 of the left retention coupler 1 is biased against the right retention member 22 of the right retention member 2 so as to retain the foldable table at the unfolded position.

Figure 16:
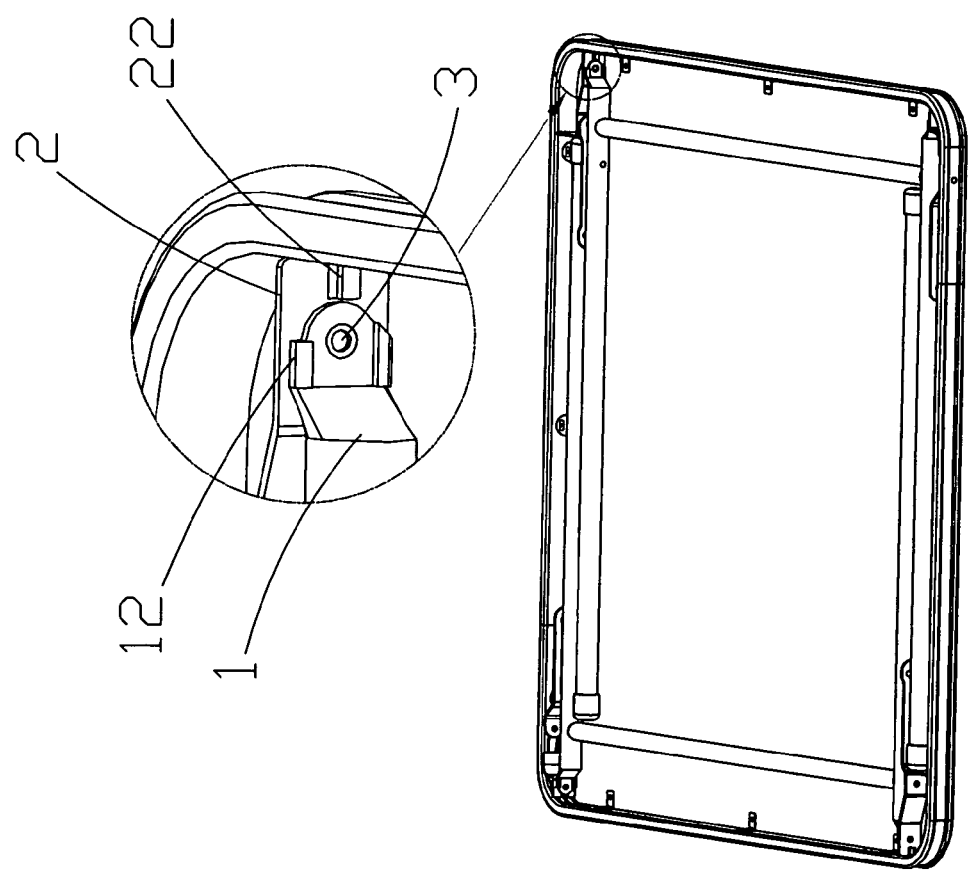
FIG. 16 is a perspective view of the retention structure incorporating with the folding table according to the above third preferred embodiment of the present invention, illustrating the foldable table being folded at its folded position.

FIG. 16 illustrates the folded position of the foldable table which is incorporated with the retention structure of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A retention structure for incorporating with an existing foldable furniture having two folding legs pivotally coupled via a pivot shaft, wherein said retention structure comprises:

a left retention coupler which comprises a first tubular portion adapted for coupling with one of said folding legs, a first through hole provided transversely, and two left retention members protruding sidewardly;

a right retention coupler which comprises a second tubular portion adapted for coupling with another folding leg, a second through hole provided transversely, and two right retention members protruding sidewardly;

wherein said two left retention members are spacedly and integrally protruded at an outer circumferential edge of said left retention coupler toward said right retention coupler, wherein said two right retention members are spacedly and integrally protruded at an outer circumferential edge of said right retention coupler toward said left retention coupler, wherein said left and right retention couplers are coupled with each other at a position that said first and second through holes are coaxially aligned for said pivot shaft slidably passing therethrough to enable said folding legs being folded in a pivotally movable manner and to retain said left and right retention couplers in position, wherein said left and right retention couplers are driven to coaxially rotated until one of said left retention members is biased against one of said right retention members for retaining said foldable furniture at a folded position when said folding legs are pivotally moved to move said foldable furniture at said folded position, wherein said left and right retention couplers are driven to coaxially rotated at an opposite direction until another left retention member of said left retention members is biased against another right retention member of said right retention members for retaining said foldable furniture at an unfolded position when said folding legs are pivotally moved to move said foldable furniture at said unfolded position.

* * * * *